United States Patent
Autenrieth

(10) Patent No.: US 6,866,091 B2
(45) Date of Patent: Mar. 15, 2005

(54) DEVICE FOR VAPORIZING AND/OR SUPERHEATING A COMBUSTIBLE

(75) Inventor: Rainer Autenrieth, Grossbottwar (DE)

(73) Assignee: DaimlerChrysler AG, Stuttgart (DE)

(*) Notice: Subject to any disclaimer, the term of this patent is extended or adjusted under 35 U.S.C. 154(b) by 117 days.

(21) Appl. No.: 10/181,160

(22) PCT Filed: Dec. 22, 2000

(86) PCT No.: PCT/EP00/13210
§ 371 (c)(1), (2), (4) Date: Jul. 16, 2002

(87) PCT Pub. No.: WO01/55026
PCT Pub. Date: Aug. 2, 2001

(65) Prior Publication Data
US 2003/0059729 A1 Mar. 27, 2003

(30) Foreign Application Priority Data
Jan. 26, 2000 (DE) .......................... 100 03 275

(51) Int. Cl.$^7$ ............... B01J 8/02; H01M 8/06; B01D 1/30

(52) U.S. Cl. ............... 165/64; 48/127.9; 122/23; 431/5; 431/7

(58) Field of Search ............... 48/127.9; 165/64, 165/164; 122/4 D, 23; 423/437.1, 651, 652; 431/5, 7, 12; 429/17

(56) References Cited

U.S. PATENT DOCUMENTS

| 4,650,727 A | * | 3/1987 | Vanderborgh et al. ........ 429/19 |
| 4,670,359 A | | 6/1987 | Beshty et al. ................ 429/17 |
| 5,823,252 A | | 10/1998 | Waitkat et al. .............. 165/166 |
| 6,187,066 B1 | | 2/2001 | Benz et al. ................ 48/127.9 |
| 6,268,075 B1 | | 7/2001 | Autenrieth et al. .......... 429/17 |

FOREIGN PATENT DOCUMENTS

| DE | 4426692 | 10/1998 |
| DE | 19639150 | 2/2001 |
| EP | 0920064 | 6/1999 |
| EP | 0924163 | 7/2001 |
| WO | 9423813 | 10/1994 |
| WO | 9919456 | 4/1999 |

* cited by examiner

Primary Examiner—Stanley S. Silverman
Assistant Examiner—Maribel Medina
(74) Attorney, Agent, or Firm—Davidson, Davidson & Kappel, LLC

(57) ABSTRACT

A method for vaporizing and/or superheating a combustible/water mixture, wherein the combustible is especially methanol, for supplying a gas generation system (2) belonging to a fuel cell installation (3). The waste-gas from the fuel cell and/or gas generation system is catalytically combusted together with a gas containing oxygen in order to produce the thermal energy required therefore. The combustible is added in a dosed manner to the volume flow from the gas containing oxygen and the waste gases of the fuel cell and/or gas generator system in the direction of flow prior to catalytic combustion.

6 Claims, 1 Drawing Sheet

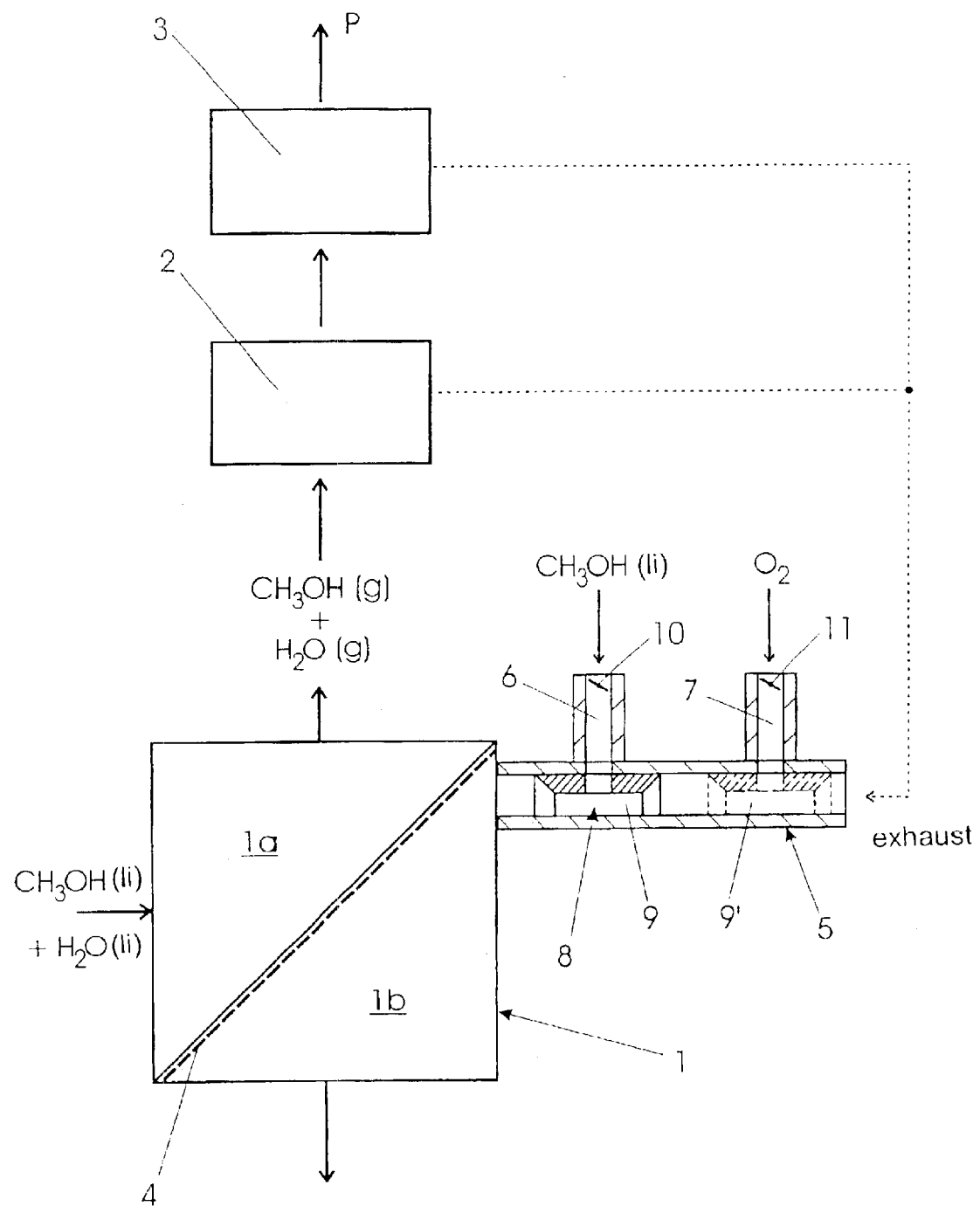

DEVICE FOR VAPORIZING AND/OR SUPERHEATING A COMBUSTIBLE

BACKGROUND OF THE INVENTION

The present invention relates to a method for vaporizing and/or superheating a fuel or a fuel/water mixture for a fuel cell system. Moreover, the present invention relates to a device for carrying out such a method.

Heat exchangers which are suitable for vaporizing and/or superheating media are known from the related art. Thus, for instance, German Patent DE 44 26 692 C1 describes a heat exchanger which is composed of foils which are stacked one over another and provided with reactant channels.

In this context, a reactant flowing in a first region of the heat exchanger is heated and/or vaporized by a heat-transfer medium which flows in a second region of the heat exchanger that is in heat-conductive contact with the first region.

German Patent DE 196 39 150 C2 discloses a central heating device in which a catalytic oxidation of a fuel takes place. The thermal energy which is produced in the process can then, for example, be supplied to the heat carrier and thus be used for operating the above mentioned heat exchanger. The fuel used can be an arbitrary gaseous or liquid medium which is able to be catalytically oxidized. The examples given for the fuel in the above mentioned document are the starting material for the gas generation, in this case methanol, the product gas produced in the gas generation system or a hydrogen-containing exhaust gas of the fuel cell.

When a vaporizer of that kind is now used in a corresponding gas generation system for supply to a fuel cell system, then a very poor dynamic response ensues, in particular, in the case of step changes in load, because the vaporizer constitutes the first member in the reaction chain, while in the heating region the thermal energy is usually produced with the exhaust gas of the fuel cell and/or of the gas generation system, the vaporizer can respond to the required load change only in a lagging manner.

Located between the vaporizer and the fuel cell, which ultimately generates the requested power, are several reaction spaces of the gas generation system which each have different response times due to their structure and which, together with the fuel cell, deliver the exhaust gases required for producing the thermal energy. Due to this feedback between the vaporization region and the combustion region, therefore, the very unsatisfactory dynamic response of the overall system ensues, which turns out to be very disadvantageous for a mobile use of the fuel cell system in a motor vehicle.

SUMMARY OF THE INVENTION

A method of this type is known from European Patent Application EP 0 920 064 A1. In this context, methanol and water are vaporized or superheated in a reforming reactor by thermal contact with a hot gas. The hot gas is produced in a catalytic burner which receives anode exhaust gas and air. During certain operating phases, in addition, liquid methanol is introduced into the air supply of the burner. To vaporize this additional fuel, a heat exchanger is located in the exhaust area of the burner, the heat exchanger being used to transfer thermal energy from the hot exhaust gas of the burner to the air/methanol flow, thereby vaporizing the methanol. This system has the disadvantage that the energy required for vaporizing the additional fuel is extracted from the hot exhaust gas and is therefore no longer available for heating the reforming reactor.

Therefore, an object of the present invention is to devise an improved method for vaporizing and/or superheating a fuel or a fuel/water mixture for supply to a gas generation system of a fuel cell system, whereby a very fast dynamic response can be achieved.

Because a part of the fuel itself is metered into the volume flow of the oxygen-containing gas and of the exhaust gases of the fuel cell and/or of the gas generation system, it being possible for the oxygen-containing gas to be, in particular, air but also oxygen-containing cathode exhaust gas of the fuel cell or a mixture of both, the thermal energy content of the volume flow can be increased with a fast dynamic response, resulting in the advantage that the catalytic combustion is also very quickly able to supply a higher thermal energy. This permits at least nearly undelayed vaporization and/or superheating of the fuel or of the fuel/water mixture, making it possible to respond very quickly to an increased power demand. Thus, the quantity of vaporized and/or superheated fuel or fuel/water mixture required for generating the requested increased power is available to the gas generating system in a particularly advantageous manner without significant time delay.

A further advantage arises because the metering, which can be carried out as a function of the required amount of heat and consequently of the electric power requested from the fuel cell system, takes place prior to the actual catalytic combustion and therefore no further thermal energy is extracted from the combustion or from the space, in which the combustion takes place, for the fine dispersion and/or for the vaporization of the added additional fuel.

In a particularly advantageous embodiment of the present invention, the fuel is atomized when it is introduced into the volume flow of the oxygen-containing gas and the exhaust gases of the fuel cell and/or of the gas generation system. In this context, the energy required for atomization can be taken as mechanical energy from the pressure or the flow velocity of the volume flow and of the fuel to be introduced. A fuel, which is dispersed in fine particles in the volume flow, is in fact sufficient to ensure the functioning of the catalytic combustion.

In the above mentioned embodiment of the present invention, the device features a gas-assisted nozzle for this which increases the flow velocity in the volume flow by a narrowing and introduces the fuel into the volume flow in this region. In the process, the fuel is atomized in the volume flow by the energy of flow thereof.

Thus, the reaction chamber for the catalytic combustion receives a mixture which is composed of the required gases and the additional, finely dispersed fuel, and is able to be catalytically burned without further significant absorption of thermal energy. This results in the advantage that all thermal energy developing during the combustion is immediately available for vaporizing and/or superheating the fuel or the fuel/water mixture, and that the fuel cell system is therefore very quickly able to respond to a required step change in load.

BRIEF DESCRIPTION OF THE DRAWING

Further advantageous embodiments of the present invention as well as possible devices for carrying out the method according to the present invention follow from the exemplary embodiment which is schematically described below with reference to the drawing which shows device according to the present invention.

DETAILED DESCRIPTION

The only attached FIGURE shows such a heat exchanger 1 which is joined up by a schematically indicated gas generation system 2 and a fuel cell 3. In this context, heat exchanger 1 features two regions 1a, 1b which are in heat-conductive contact with each other but sealed from each other for the fluids which flow therethrough, respectively.

In this context, region 1b of heat exchanger 1 has a schematically indicated catalytic coating 4, a catalytic filling, or the like, which is required for a catalytic combustion of the supplied substances. The energy which develops during the catalytic combustion in region 1b of heat exchanger 1 then reaches the other region 1a of heat exchanger 1. A liquid fuel or a liquid fuel/water mixture, which, in the exemplary embodiment shown, is assumed to be a methanol/water mixture ($CH_3OH+H_2O$), and which is fed to region 1a, is vaporized in region 1a of heat exchanger 1 by the thermal energy coming from the catalytic combustion.

Given sufficient thermal energy, the vaporous or gaseous mixture of water and methanol is also superheated in region 1a of heat exchanger 1. Then, this mixture of water and methanol gets into gas generation system 2, which is indicated schematically and whose mode of operation is known per se, and into fuel cell 3, possibly after an optional gas cleaning stage (not shown).

Since the mode of operation of these components 2, 3 is known per se and of no further importance to the present invention, it will not be further discussed in detail.

Fuel cell 3 then delivers the requested power P in the form of electric power. Exhaust gases containing combustible residuals such as residual methanol or residual hydrogen arise in both components 2, 3, predominantly however in an anode chamber of fuel cell 3. According to the arrows shown in broken lines, these exhaust gases, at least partially, reach a line 5 via which they can be fed to region 1b of heat exchanger 1 again for catalytic combustion.

If now a higher power P is suddenly requested from fuel cell 3, then, of course, the quantity of methanol/water mixture which is vaporized in heat exchanger 1 has to be increased as fast as possible.

In this context, in order for the entire system to function smoothly, it is required that this additionally added quantity of methanol/water mixture be vaporized in an at least nearly undelayed manner.

However, the problem now arises that mainly the exhaust gases of fuel cell 3 and of gas generation system 2 are used for producing the thermal energy for the vaporization. However, since at the time of the increased power demand, the quantity of exhaust gas has not yet been increased because no increased quantity of vapor is available yet, this feedback results in a time delay in the vaporization of the methanol/water mixture and, consequently, in a time delay between the power request and the actually possible delivery of requested power P by fuel cell 3.

This problem is solved in that liquid methanol fuel ($CH_3OH$) is fed via a line element 6 to the volume flow of the exhaust gases of gas generation system 2 and/or of fuel cell 3.

To improve the combustion, these exhaust gases have previously already been mixed with an oxygen-containing gas ($O_2$), here, in particular, air or oxygen-containing exhaust gas of an anode chamber of fuel cell 3, which flows in via a connection element 7. This volume flow now takes up the fuel from line element 6 which is able to be metered in as a function of requested power P of fuel cell 3. The mixture formed in this manner flows into region 1b of heat exchanger 1 and is catalytically burned there.

In this context, it is important that region 1b already receive a mixture of the exhaust gases, the air and the methanol, that has been uniformly distributed so that no thermal energy, which could be used for vaporizing the methanol/water mixture in region 1b of heat exchanger 1 is extracted in region 1b of heat exchanger 1 for mixing and/or vaporizing the individual components in the volume flow.

Therefore, in order for the liquid methanol supplied via line element 6 to be distributed in the volume flow as uniformly as possible, use is made of a gas-assisted nozzle 8 which uses the energy of flow of the volume flow for atomizing the liquid methanol.

To this end, the region, in which line element 6 opens out into line 5, features a narrowing 9 which, due to the law of continuity, causes an accelerated flow, i.e., a higher flow velocity in the region of narrowing 9. In this context, the methanol supplied via line element 6 is taken up by the volume flow flowing through line element 6 and atomized therein.

In this connection, narrowing 9 can be designed in the manner of a venturi nozzle, as is schematically shown in the exemplary embodiment, but can also be formed by a lance-type end of line element 6 (not shown) that reaches into line 5.

In this context, the methanol can be metered via a throttle device 10 in line element 6 or via a suitable controllable delivery device (not shown). In this context, the volume flow of liquid methanol flowing through line element 6 is in each case controlled in open or closed loop as a function of power P requested from fuel cell 3.

Something comparable to what happens to the liquid methanol is also true for the air which reaches line 5 via connection element 7. Here too, a narrowing 9' can optionally be formed which is indicated by a broken line in the only attached FIGURE. In this context, the mode of functioning of narrowing 9' is similar to that of narrowing 9 during the supply of the liquid methanol only that in the case of narrowing 9', two gaseous media are mixed with each other. In this process, the air, which is fed to line 5 via connection element 7, can also be controlled in open or closed loop as a function of the power requested from fuel 3 and, consequently, of the thermal energy necessary in heat exchanger 1. In this context, it is thus possible to use a throttle valve 11 or the like in connection element 7 to be able to influence the volume flow of the air.

What is claimed is:

1. A device for vaporizing and/or superheating a liquid fuel for a gas generation system of a fuel cell system having a fuel cell, the fuel cell or gas generation system producing exhaust gases, the device comprising:

a heat exchanger having a first region and a second region, the first and the second region being separated from each other and being in heat-conductive contact with each other, and a liquid fuel being vaporized and/or superheated in the first region, the second region containing a catalyst for catalytic combustion;

a line for supplying the exhaust gases to the second region; a line element for supplying additional liquid fuel to the line; and a connection element for supplying oxygen-containing gas to the line; the line, upstream of the heat exchanger in a flow direction of the exhaust gases having a narrowing in a region of the line element, and the narrowing being downstream of the connection element.

2. The device as recited in claim 1 wherein the line element includes a device for open- or closed-loop control of the volume flow of the additional liquid fuel that flows therethrough.

3. The device as recited in claim 1 wherein the narrowing is a venturi nozzle.

4. The device as recited in claim 1 wherein the line element extends into the line in the region of the narrowing.

5. The device as recited in claim 1 wherein the connection element includes a throttle device.

6. The device as recited in claim 1 wherein the line has a further narrowing and the connection element connects to the line in a region of the further narrowing.

* * * * *

UNITED STATES PATENT AND TRADEMARK OFFICE
CERTIFICATE OF CORRECTION

PATENT NO. : 6,866,091 B2
DATED : March 15, 2005
INVENTOR(S) : Rainer Autenrieth It is certified that error appears in the above-identified patent and that said Letters Patent is hereby corrected as shown below:

Column 2,
Line 66, please insert -- a -- after the word "shows".
Line 66, should read -- with reference to the drawing which shows a device according --.

Column 4,
After line 11, please insert the following paragraph:
 -- Liquid fuel as defined herein may include pure liquid fuel or a pure liquid fuel/water mixture. --.

Signed and Sealed this

Fourth Day of October, 2005

JON W. DUDAS
*Director of the United States Patent and Trademark Office*